(12) United States Patent
García Martín et al.

(10) Patent No.: US 11,992,994 B2
(45) Date of Patent: May 28, 2024

(54) LAMINATE MANUFACTURING

(71) Applicant: AIRBUS OPERATIONS, S.L.U., Madrid (ES)

(72) Inventors: Diego García Martín, Madrid (ES); Raúl Burgos Gallego, Madrid (ES); Jorge Juan Galiana Blanco, Madrid (ES); Nuria Rodrigo Caballero, Madrid (ES); Aquilino García García, Madrid (ES); Augusto Pérez Pastor, Madrid (ES); Julián Martin Isabel, Madrid (ES); Fernando Muñoz Ajenjo, Madrid (ES)

(73) Assignee: AIRBUS OPERATIONS, S.L.U., Madrid (ES)

( * ) Notice: Subject to any disclaimer, the term of this patent is extended or adjusted under 35 U.S.C. 154(b) by 0 days.

(21) Appl. No.: 17/727,173

(22) Filed: Apr. 22, 2022

(65) Prior Publication Data
US 2022/0339852 A1     Oct. 27, 2022

(30) Foreign Application Priority Data
Apr. 23, 2021 (EP) ..................... 21382357

(51) Int. Cl.
*B29C 70/38* (2006.01)
*B29C 51/12* (2006.01)
(Continued)

(52) U.S. Cl.
CPC .............. *B29C 51/14* (2013.01); *B29C 51/12* (2013.01); *B29C 51/20* (2013.01); *B29C 51/421* (2013.01); *B29C 70/42* (2013.01)

(58) Field of Classification Search
CPC . B29C 70/388; B29C 70/384; B29C 53/8008; B29C 53/56; B29C 64/147
See application file for complete search history.

(56) References Cited

U.S. PATENT DOCUMENTS

| | | | |
|---|---|---|---|
| 3,300,355 A * | 1/1967 | Adams ................. | B29D 99/001 156/196 |
| 2004/0043196 A1 * | 3/2004 | Willden ................. | B29C 43/18 428/174 |

(Continued)

FOREIGN PATENT DOCUMENTS

| | | |
|---|---|---|
| FR | 3 037 524 | 12/2016 |
| WO | 2013/030467 | 3/2013 |
| WO | WO-2018168511 A1 * | 9/2018 ........... B29C 64/147 |

OTHER PUBLICATIONS

Search Report for EP21382357.8, dated Oct. 18, 2021, 1 page.

*Primary Examiner* — Matthew J Daniels
(74) *Attorney, Agent, or Firm* — Nixon & Vanderhye P.C.

(57) ABSTRACT

A manufacturing system (1) for manufacturing shaped laminates including: forming tools (2.1, 2.2) extending along a longitudinal direction X, located parallel to one another and configured to receive a laminate (4) between the forming tools; a shaping tool (3) extending along the longitudinal direction X and along a transversal direction Z, and configured to receive the laminate (4) on an external surface of the shaping tool, wherein the forming tools (2.1, 2.2) or the shaping tool (3) are movable in the longitudinal direction X and in the transversal direction Z, relative to the at least one of the shaping tool (3) and the two forming tools (2.1, 2.2).

10 Claims, 4 Drawing Sheets

(51) Int. Cl.
    *B29C 51/14*     (2006.01)
    *B29C 51/20*     (2006.01)
    *B29C 51/42*     (2006.01)
    *B29C 70/42*     (2006.01)

(56) References Cited

U.S. PATENT DOCUMENTS

2004/0226651 A1    11/2004  Ledet et al.
2016/0121560 A1*  5/2016  Lee ...................... B29C 70/541
                                                    425/504
2021/0129456 A1*  5/2021  Inagaki ................... B29C 70/10

\* cited by examiner

LAMINATE MANUFACTURING

RELATED APPLICATION

This application incorporates by reference and claims priority to European Patent Application EP21382357.8, filed Apr. 23, 2021.

TECHNICAL FIELD

This invention belongs to the field of manufacturing, particularly of composite laminate shapes of any kind formed by means of forming processes to obtain closed profiles or complex geometries for the manufacturing of aeronautical parts. The present invention defines a manufacturing system and process for the manufacturing of composite laminate shapes.

BACKGROUND

Currently, laminate shapes can be obtained from the combination of laminate laying and a subsequent hot-forming process of the laid-up laminate. The hot-forming process is performed using an elastic membrane, which forces the laminate into the required shape by means of a forming tool configured with a determined geometry that provides the required shape when a vacuum is applied under the elastic membrane.

The hot-forming process is very aggressive with the elastic membranes. The process causes the membranes to be frequently broken during the forming process, especially if the laminate has an aggressive or complex shape.

Additionally, in the hot-forming process, there are zones where the elastic membrane is not able to press adequately the laminate against the forming tool. In these zones, wrinkles and malformations may appear on the surface of the part to be configured.

Moreover, the hot-forming processes involve press machines to form laminates. With said methods a torsion on the shape of a section can be produced and thus orientation of an axis defined by any wall elements in a cross section is not the same throughout all the length of the part.

However, such methods and systems are only able to provide laminate parts which form are straight and cannot produce parts with significant curvatures. Also, said straight parts are susceptible of having wrinkles in their configuration, which reduces the required properties of the manufactured parts.

Additionally, the known methods are not able to provide a constant pressure during the manufacturing of the laminate part, not even by leaving a geometrical gap as the only parameter which remains constant.

SUMMARY

The present invention provides a solution to the aforementioned problems, by means of a manufacturing system, and/or a manufacturing method In a first inventive aspect, the invention provides a manufacturing system for manufacturing shaped laminates, the manufacturing system comprising: at least two forming tools extending along a longitudinal direction X, located parallel to one another and being configured for receiving a laminate in-between, at least one shaping tool extending along the longitudinal direction X and along a transversal direction Z and being configured for receiving the laminate on its external surface, wherein the at least two forming tools or the at least one shaping tool are movable in the longitudinal direction X and in the transversal direction Z, relative to the at least one shaping tool or the two forming tools respectively.

Throughout this document, three different directions for the manufacturing of a shaped laminate are to be considered. The laminate extends along a longitudinal direction X and along a transversal direction Z, perpendicular to the longitudinal direction X. The laminate also extends in depth along a direction Y, also perpendicular to the mentioned directions X and Z.

The at least two forming tools are rigid bodies which extend along the longitudinal direction X, and are able to move both in the longitudinal direction X and in the transversal direction Z. The forming tools turn in the transversal direction Z to apply pressure to the laminate located between the forming tools. Additionally, the forming tools extend in depth along the perpendicular direction Y, in the same manner as the laminate. Portions of laminate which have already been pressed between the at least two forming tools are released, thus leaving a portion of laminate free which can be applied onto the at least one shaping tool.

The at least two forming tools also apply pressure to the released portions of laminate against the at least one shaping tool, being the cinematics of the at least two forming tools in the longitudinal direction X and transversal direction Z either different or the same in different sections along the perpendicular direction Y.

Thus, two different pressures are applied to the laminate by forces exerted by the at least two forming tools. The forces may be applied pneumatically. The first pressure is applied by the at least two forming tools when the laminate is located between the forming tools. The second pressure is exerted by at least one of the forming tools on the portion of the laminate supported on the at least one shaping tool. The laminate is pressed between the at least two forming tools to avoid wrinkles, whilst at least one of the at least two forming tools presses the laminate against the at least one shaping tool.

In a particular embodiment, the pressures exerted on the laminate are originated by an adjustable pneumatic force, which remains constant during the manufacturing process, such that the variations in the thickness of the laminate due to the compression and pressure exerted, or the variation in the shape of the at least one shaping tool, can be absorbed and thus coped with.

In a particular embodiment, and in addition to the aforementioned forces obtained by the pressures applied to the laminate, a movement in the transversal direction Z is performed by the at least two forming tools, and/or by the at least one shaping tool, in order to release progressively the laminate over the at least one shaping tool. Preferably, said movement is provided by electric actuators, by means of which an adjustable and constant speed of movement of the at least two forming tools and/or the at least one shaping tool is achieved.

Moreover, in order to conform to different geometries of shaped laminate parts, the shaping tool can advantageously be exchanged, whilst maintaining the same forming tools. This allows saving costs during the manufacturing processes as different parts can be manufactured with common equipment.

Advantageously, the cinematics of the at least two forming tools are simplified, avoiding complex tooling manufacturing tolerances, as needed in the current manufacturing processes which require a geometrical gap which needs to remain constant during said manufacturing process.

That is, a complex geometry laminate part, such as a C spar with stringers or a Nose Geometry leading edge, can be obtained from a flat shape laminate by means of the mentioned applied pressure and tools, with a manufacturing system that allows a more accurate shaping of the laminate.

Particularly, the relative movement obtained between the at least two forming tools and the at least one shaping tool allows obtaining a generatrix for the guidance of the movement and thus for the shaping of the laminate. This generatrix, particularly formed by the edge of the at least two forming tools and the at least one shaping tool, can be a straight line or curved, the sections, e.g. the edges of said tools (at least one of the forming tools and the at least one shaping tool), being equal or similar in the perpendicular Y direction in a particular embodiment.

In an embodiment, the first pressure or the second pressure or both are constant.

Such pressures result in a laminate shaped with an adequate thickness, so that the original composite laminate comprises a higher thickness and a predetermined number of layers.

In an embodiment each forming tool is a plate.

In an embodiment the forming tools are metallic.

In an embodiment the at least two forming tools are flat, shape which allows a better application of the mentioned pressure on the laminate located in-between.

In a particular embodiment, the manufacturing system comprises pneumatic means configured to apply pressure to the laminate by means of the at least two forming tools.

In a particular embodiment, the manufacturing system comprises a heater configured to apply heat to the laminate.

Such pneumatic means allow the exertion of first and/or second pressure on the laminate. Moreover, heater allows a higher temperature on the laminate, which cooperates with the pressure exerted in order to shape up the laminate part with the required configuration.

The adequate heating of the laminate is that which achieves the right temperature for the resin present in the composite laminate to be in a semiliquid state, thus allowing the internal sliding of the different layers of the laminate, such that the laminate adapts better to the at least one shaping tool.

In a particular embodiment, the manufacturing system further comprises at least one electric actuator configured to actuate the at least two forming tools and/or the at least one shaping tool. Such electric actuator allows the mentioned tools to move along the longitudinal direction X or transversal direction Z, according to the requirements of the shaped laminate to be obtained.

In a particular embodiment, the at least two forming tools or the at least one shaping tool are fixed.

This advantageously allows the movement of one of the manufacturing tools, thus being able to provide cinematics of the movement of the tools along the longitudinal direction X and transversal direction Z either to the forming tools or to the shaping tools. By maintaining one of the manufacturing tools fixed, the accuracy of the manufacturing process increases.

In an embodiment, the section in the perpendicular direction Y of at least one of the two forming tools and the external surface of the at least one shaping tool have the same geometrical shape in a direction Y perpendicular to the longitudinal direction X and the transversal direction Z.

Advantageously, this coincident shaping of the complementary tools in the case of constant thickness laminates allows a better shaping of the curved portions of the manufactured laminate part, thus allowing appropriate compaction and avoiding appearance of wrinkles.

In an embodiment, the manufacturing system further comprises at least one finger, located on one of the at least two forming tools and movable in the longitudinal direction X and in the transversal direction Z, relative to the at least one shaping tool, the finger being configured to apply pressure on the laminate according to the longitudinal direction X.

Particularly, such at least one finger follows the movement, i.e. the cinematics, defined by the at least two forming tools. In the event that said at least two forming tools are fixed, the at least one finger will also be fixed, being the at least one shaping tool the one which moves relative to the mentioned fixed tools.

The additional pressure exerted by means of the at least one finger allows a better shaping of the released portion of the laminate when applied to the at least one shaping tool and thus reduces the risk of wrinkles or malformations of the shaped laminate part.

Advantageously, said at least one finger allows the at least two forming tools and the at least one shaping tool to better adapt to the required shape of the laminate, e.g. when the thickness of the laminate before forming or the thickness of the formed laminate part to be obtained is variable.

Such a thickness variation in the original or final shaping of the laminate would require additional forming or shaping tools for each geometry, which is advantageously avoided by means of the mentioned at least one finger, thus remaining said tools as adequate for a wide variety of geometries required for the shaped laminate.

In an embodiment, the at least one finger is made of a material on which a composite laminate can slide, preferably Teflon. Such material allows a quicker release of portions of the laminate to be shaped against the at least one shaping tool.

In an embodiment, the manufacturing system further comprises a fixing tool configured to fix a first end of the laminate to the at least one shaping tool.

That is, the released portion of the laminate can be attached, by means of the fixing tool, to the at least one shaping tool, such that the shaping of the laminate part by means of the at least two forming tools is easier as the laminate cannot move or displace with any movement or pressure applied therein, i.e. any relative displacement of the laminate with respect of the surface of the at least one shaping tool on which it rests.

Thus, this fixing tool provides a constant pressure to the portion of the laminate, and thus a force which helps positioning the laminate on the at least one shaping tool as mentioned.

In an embodiment, the laminate is a composite laminate, particularly made of carbon fiber reinforced plastic (CFRP).

In an embodiment, the shaped laminate obtained by means of the manufacturing system according to the first inventive aspect can be subsequently combined with additional laminates (which may be also shaped laminates), in order to obtain a final part, i.e. by means of additional proceedings such as the co-bonding or co-curing of several laminates.

In a second inventive aspect, the present invention provides a manufacturing method for manufacturing shaped laminates by means of a manufacturing system according to the first inventive aspect, the method comprising the following steps:

a) providing a flat laminate and locating it between the at least two forming tools, b) compressing the flat laminate by applying pressure to said flat laminate by means of the at least two forming tools, c) sliding a first compressed portion of laminate from the at least two forming tools, d) applying said first compressed portion of laminate over the external surface of the at least one shaping tool, e) releasing subsequent compressed portions of laminate by a relative movement between the at least two forming tools and the at least one shaping tool, and f) obtaining a shaped laminate according to at least a portion of the perimetral shape of the at least one shaping tool.

The flat laminate, previously laid-up, and preferably a CFRP laminate, which is to be configured in shape by means of the manufacturing system previously described, is captured between the at least two forming tools, in order to have it positioned such that said at least two forming tools can apply the pressure indicated in step b).

The location in-between said at least two forming tools of the laminate is such that the laminate is able to slide from its position, being a portion of the laminate released from the at least two forming tools. That is, the pressure applied in step b) is such that the laminate is compressed in-between said tools but not enough to avoid the sliding of subsequent portions of the laminate when it has already been pressed and/or heated if the manufacturing system comprises a heater.

Thus, the laminate portions are released whilst the at least two forming tools or the at least one shaping tool move relative to the other, so that the released portions in step e) are applied to and pressed against the external surface of the at least one shaping tool, thus being configured according to its profile, in step f).

After the performance of the mentioned steps, in a preferred embodiment the shaped laminate has turned 180° around the at least one shaping tool. In an additional embodiment, if the same forming process is applied in the left and right side of a section of the at least one shaping tool, a 360° laminate forming process can be achieved.

In a particular embodiment, the pressure exerted in step b) on the laminate is provided by means of a constant force which provides the at least two forming tools a constant pressure. Preferably, such force is applied on the at least two forming tools by means of pneumatic devices which are part of the manufacturing system.

In a particular embodiment, after step d), a first end of the laminate is fixed to the at least one shaping tool. Thus, the laminate is hold against the at least one shaping tool, to avoid any possible movement in the longitudinal direction X and vertical direction Z of the laminate during the subsequent steps of the present method, i.e. any relative displacement of the laminate with respect of the surface of the at least one shaping tool on which it rests.

In a particular embodiment, the mentioned fixing of the first end of the laminate to the at least one shaping tool is provided by a fixing tool. This fixing tool provides a constant pressure to the first end of the laminate, and thus a force which helps positioning the laminate on the at least one shaping tool as mentioned.

In a particular embodiment wherein the manufacturing system comprises at least one finger, and simultaneously to step e), the at least one finger moves according to the movement of the at least two forming tools whilst applying additional pressure to the released compressed portions of laminate in the longitudinal direction X, in order to achieve the adequate geometry whilst adapting to thickness variation of the laminate.

In a particular embodiment, the movement of the at least two forming tools defines a path, or generatrix, along the complete perimetral surface of the at least one shaping tool.

Particularly, the relative movement obtained between the at least two forming tools and the at least one shaping tool allows obtaining a generatrix for the guidance of the movement and thus for the shaping of the laminate. This generatrix, particularly formed by the edge of the at least two forming tools and the at least one shaping tool, can be a straight lined or curved, the sections of said tools (the at least two forming tools and the at least one shaping tool) being equal or similar.

In a particular embodiment, and previous to step f), a cap is formed in the released compressed portion of laminate, the cap being configured for subsequent attachment of the shaped laminate. Particularly, the mentioned cap may be used to facilitate a subsequent cobonding or cocuring process to an adjacent laminate when mounting the shaped laminate part.

All the features described in this specification (including the claims, description and drawings) and/or all the steps of the described method can be combined in any combination, with the exception of combinations of such mutually exclusive features and/or steps.

SUMMARY OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION

Figure 1:
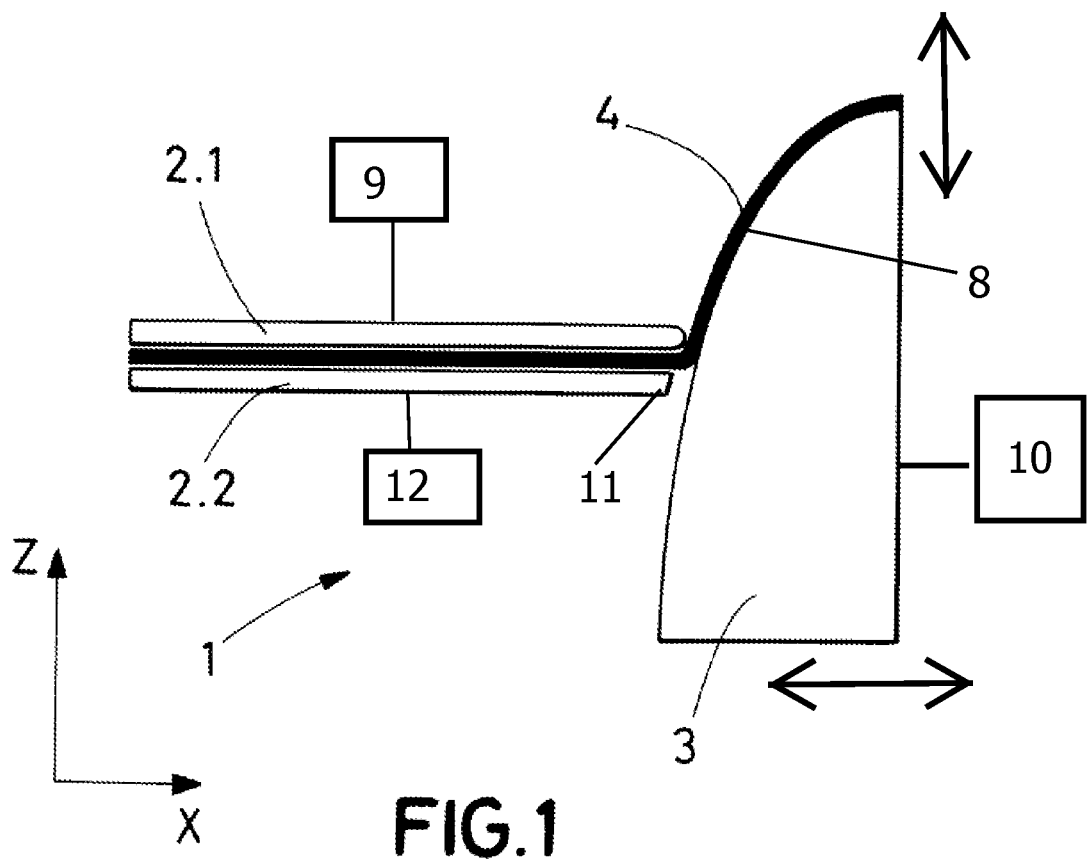
FIG. 1 shows a section of an embodiment of the manufacturing system of the first inventive aspect.

FIG. 1 shows an embodiment of a manufacturing system (1) according to the present invention. The manufacturing system (1) comprises two forming tools (2.1, 2.2) and a shaping tool (3). The forming tools (2.1, 2.2) extend along a longitudinal direction X, are located parallel to one another and are configured for receiving a laminate (4) in-between. The shaping tool (3) extends along the longitudinal direction X and along a transversal direction Z and is configured for receiving a laminate (4) on its external surface.

The shaping tool (3) has an outer surface (8) with a shape corresponding to a desired shape to be applied to the laminate. The laminate (4) is applied to outer surface (8) of the shaping tool to cause the laminate to take the shape of the outer surface (8).

The manufacturing system (1) may be configured to allow relative movement between the forming tools (2.1, 2.2) and the shaping tool (3) in the longitudinal direction X and in the transversal direction Z. This can be achieved by the forming tools (2.1, 2.2) being movable relative to the shaping tool (3) and/or by the shaping tool (3) being movable relative to the forming tools (2.1, 2.2). Both the forming tools (2.1, 2.2) and the shaping tool (3) may be movable for improved versatility and adaptation of the manufacturing system to complex geometries of the shaped part to be obtained.

That is, the forming tools (2.1, 2.2) press the laminate (4) in-between them, avoiding the formation of wrinkles during the manufacturing process, whilst one of the forming tools (2.1, 2.2) presses the formed laminate (4), already compressed between both forming tools (2.1, 2.2) against the shaping tool (3).

The forces which create the pressure on the laminate (4) in-between the two forming tools (2.1, 2.2) are adjustable pneumatic forces, such as a pneumatically actuated piston or bladder (9) that applies a force against one or both of the forming tools. The forces may be kept constant during the manufacturing process, so that the variation in the thickness of the laminate (4) when pressed between the forming tools (2.1, 2.2) is minimized. Any change in the shape of the two forming tools (2.1, 2.2) or of the shaping tool (3) may be compensated for by means of the mentioned adjustable pneumatic forces. Further, the forming tools (2.1, 2.2) may be configured to discharge the laminate from the ends (11) of the forming tools. In this regard, the forming tools may include conveyor belts between their inner surfaces and the laminate (4), wherein the belts advance the laminate.

As indicated, the forming tools (2.1, 2.2) and the shaping tool (3) allow a relative movement in the transversal direction Z, which is performed either by the forming tools (2.1, 2.2) and/or the shaping tool (3), depending on which of them is remained fixed, by means of electric actuators (10) which actuate on the mentioned tools (2.1, 2.2, 3).

Such electric actuators (10) are configured to move the shaping tool (3) relative to the forming tools, or vice versa. The double-headed arrows shown in FIG. 1 next to the shaping tool illustrate the relative movement between the shaping tool and the forming tools. The actuators (10) may be configured to provide an adjustable or constant speed relative movement between the shaping tool and the forming tools.

The forming tools (2.1, 2.2) are configured to release from their ends (11) portions of the laminate to allow the laminate to be applied to the surface (8) of the shaping tool (3) during the relative movement between the shaping tool and the forming tools.

In FIG. 1, the manufacturing system is shown in use, wherein a flat laminate (4) is located between the two forming tools (2.1, 2.2). The forming tools have internal surfaces between which are sandwiched the laminate. The internal surfaces are flat and parallel one to another.

The forming tools (2.1, 2.2), the shaping tool (3) and the laminate extend in depth along a direction Y, perpendicular to the directions X and Z.

During the manufacturing of the shaped laminate part, the laminate (4), as shown, is shaped by applying the laminate (4) on the external surface (8) of the shaping tool (3). In the embodiment shown, the laminate (4) extends from the upper part of the shaping tool (3), and is released from between the forming tools (2.1, 2.2) and pressed against said shaping tool (3) in order to be configured according to the external surface of said shaping tool (3).

As shown in the present figure, the two forming tools (2.1, 2.2) move, relative to the shaping tool (3), such that the laminate (4) is released and attached to the external surface of the shaping tool (3) from its upper end downwards, being the shaping tool (3) fixed.

Particularly, the upper forming tool (2.1) shown in the figure presses the laminate (4) against the shaping tool (3), whilst both forming tools (2.1, 2.2) press the laminate (4) between them.

Figure 2:
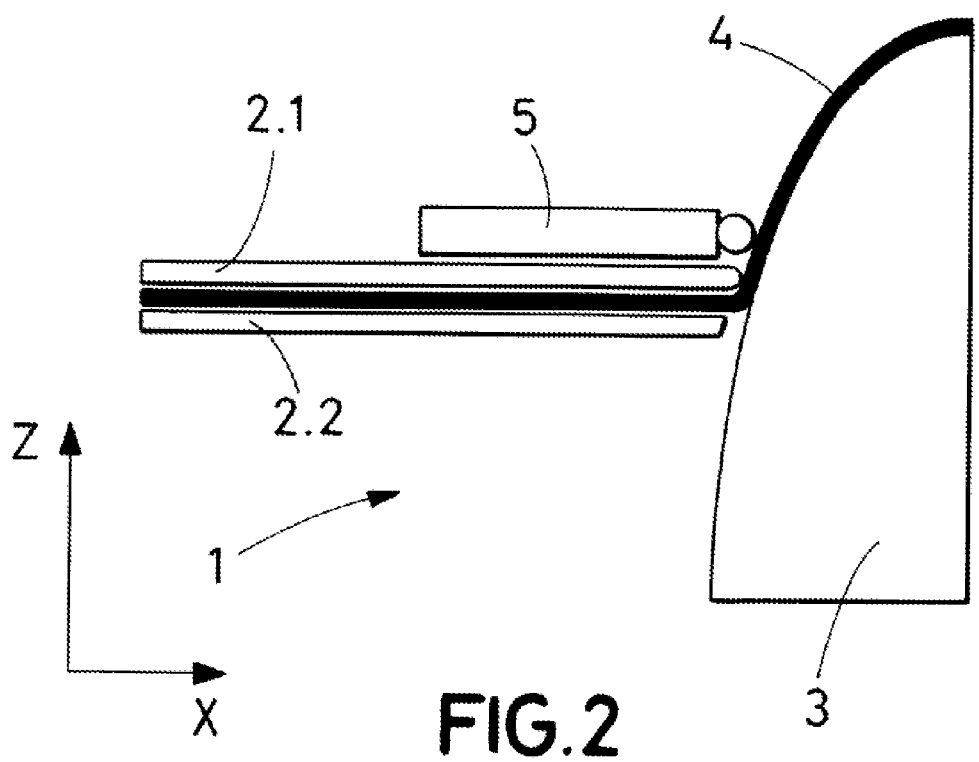
FIG. 2 shows a section of another embodiment of the manufacturing system of the first inventive aspect.

FIG. 2 shows the same manufacturing system (1), in this embodiment further including a finger (5) located on top of the upper forming tool (2.1).

Such finger (5) provides additional pressure to the laminate (4) against the shaping tool (3), thus helping the laminate (4) to adopt the curved configuration of the external surface of the shaping tool (3).

The finger (5), as shown in the present figure, follows the same path as the forming tools (2.1, 2.2), thus moving together as an integrated body, although being separate parts.

Figure 3:
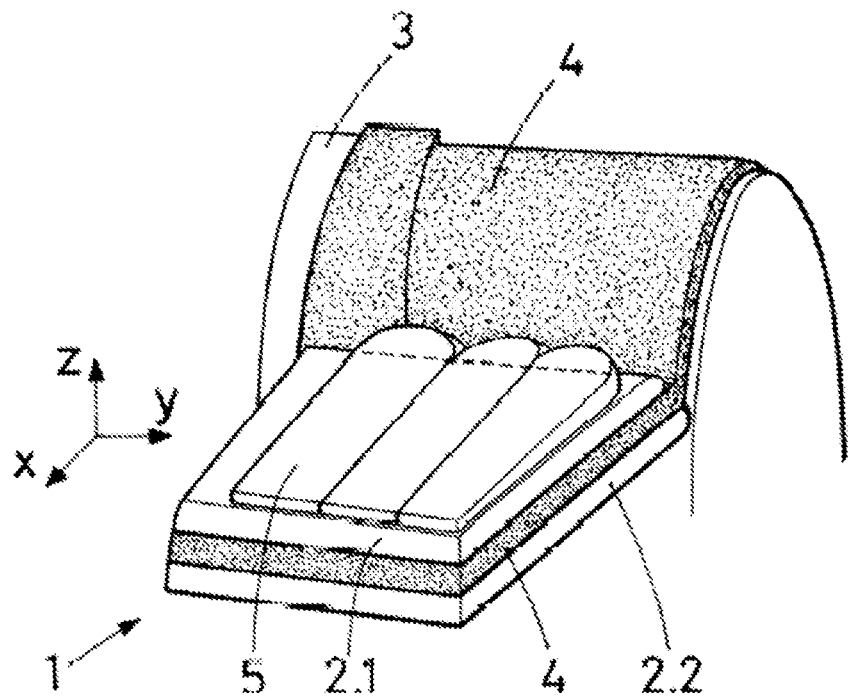
FIG. 3 shows a perspective view of an embodiment of the manufacturing system of the first inventive aspect.
Figure 4:
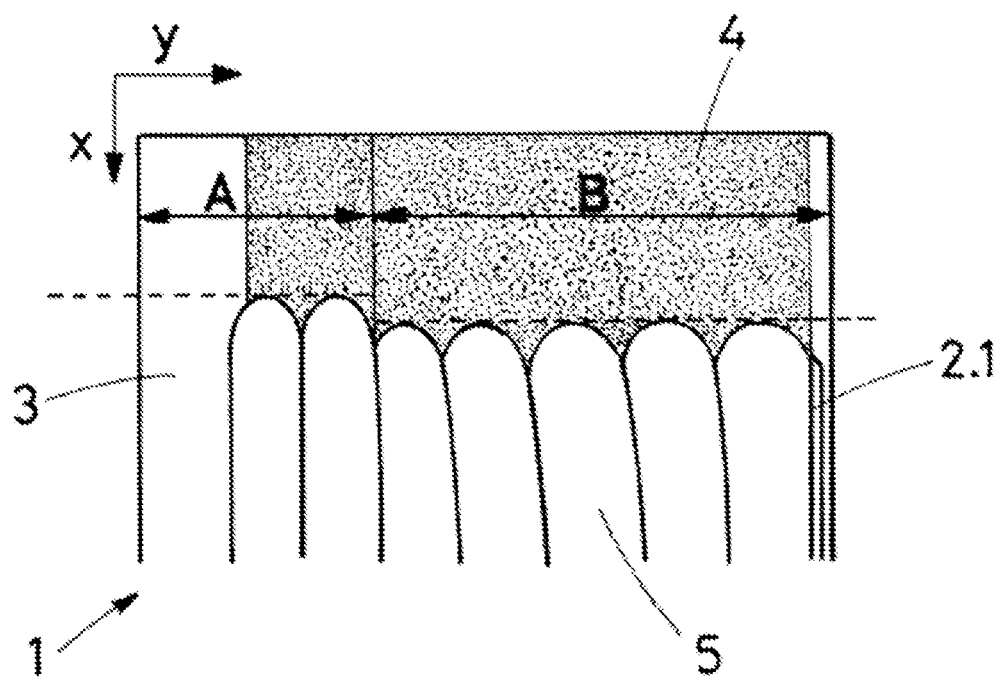
FIG. 4 shows a plan view of the embodiment of FIG. 3.

Although a single finger (5) is shown in the embodiment of FIG. 2, the manufacturing system may comprise a plurality of fingers (5) arranged along the perpendicular direction Y, as depicted in the embodiment of FIGS. 3 and 4, which respectively show a perspective view and a plan view. Additionally, the plurality of fingers (5) are able to move in the longitudinal direction X.

The provision of one or more fingers (5) allows better adaptation to thickness changes and/or ramps of the final part, without requiring modification of other elements of the manufacturing system (1).

In the embodiment of FIGS. 3 and 4, the plurality of fingers (5) are arranged on the upper forming tool (2.1), which in this embodiment is a metallic plate heated by an electric heater (12) configured to heat the metallic plate of the forming tool(s) which in turn heats the laminate.

The fingers (5) may be made of or covered with a material which permits the sliding of the laminate (4) thereon, such as Teflon.

The fingers (5) are independent from one another so that each finger may be arranged in a different position in direction X for improved adjustment to the external surface of the shaping tool (3). This is visible in FIG. 4, which schematically shows a thickness change in the final part, between regions identified as A and B in the figure. Specifically, the part thickness in region B is greater than the part thickness in region A. In this embodiment, the upper forming tool (2.1) has a straight edge and the fingers (5) compact the part of the laminate (1) with the lowest thickness, i.e. region A.

By the provision of a plurality of fingers (5), the laminate can be compacted uniformly over the shaping tool (3) and adapted to small changes in direction Y, such as small ramps or thickness changes which a flat plate (2.1, 2.2) having an edge not adapted to the shape of the shaping tool (3) might not be adapted to accurately follow.

The force applied in each finger in direction X may have a constant value. This way, the laminate can be compacted over the shaping tool (3) with a uniform force over longitudinal direction Y.

Figure 5:
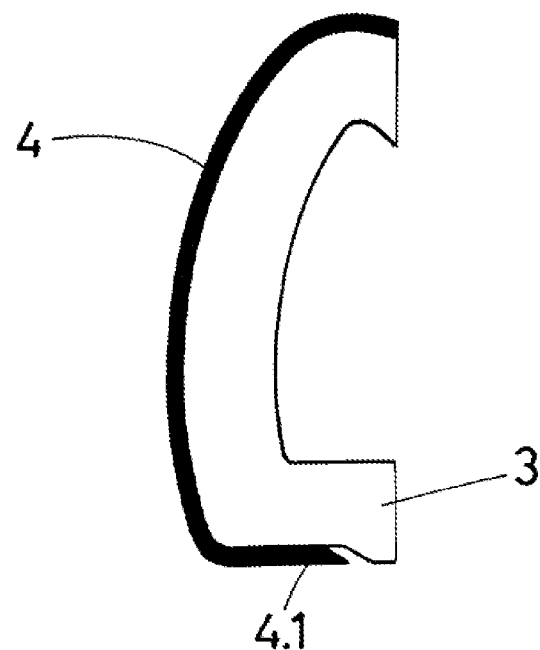
FIG. 5 shows a section of an example of configuration of a laminate part.

FIG. 5 shows a first example of configuration of a laminate (4), wherein a curved configuration has been obtained from the external surface of the shaping tool (3). Such configuration is ended by means of a cap (4.1) at the lower part of the shaping tool (3), thus being the end of the laminate (4) to be shaped.

Figure 6:
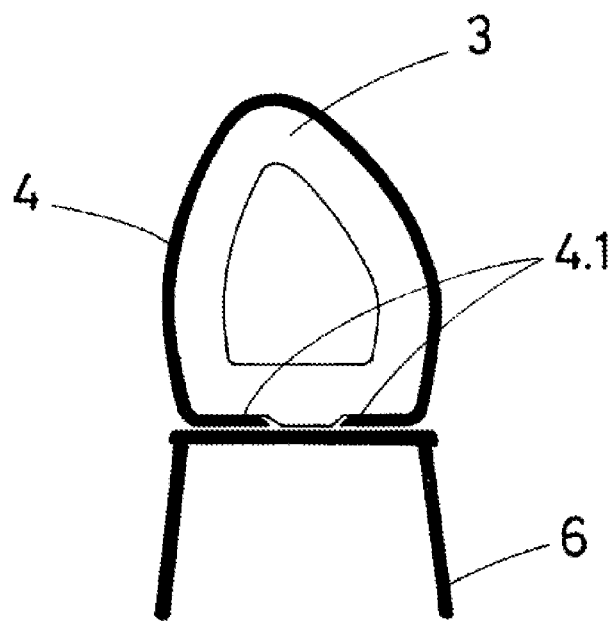
FIG. 6 shows a section of another example of configuration of a laminate part and its mounting.

FIG. 6 shows another example of configuration of a laminate (4), in this occasion perimetrally surrounding the whole external surface of the shaping tool (3), thus beginning and ending in the lower part of the shaping tool (3) by means of two caps (4.1), one at each end.

Moreover, the shaped laminate (4) is attached to an adjacent part (6), particularly by means of said caps (4.1) as shown in FIG. 6.

Figure 7:
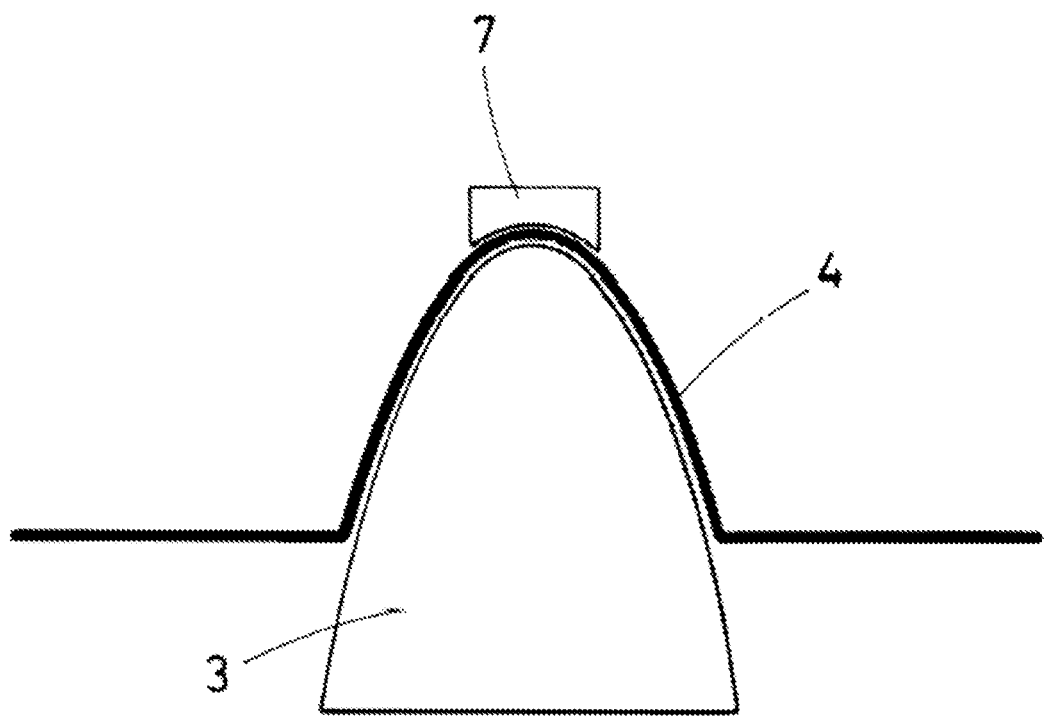
FIG. 7 shows a schematic view of an embodiment of the at least one shaping tool of the manufacturing system of the first inventive aspect, along with additional fixing means.

FIG. 7 shows a schematic view of the manufacturing of a laminate (4), particularly said laminate (4) being perimetrally surrounding the whole external surface of the shaping tool (3). Said laminate (4) rests on the mentioned surface, and is pressed against the shaping tool (3) by means of a fixing tool (7) which is positioned on top of the shaping tool (3) according to the view of the present figure.

Therefore, the fixing tool (7) presses the laminate (4) against the shaping tool (3) on one of its ends, in this occasion, on the upper end, such that the laminate (4) is kept in the defined position, avoiding any relative displacement with respect to the surface of the shaping tool (3).

The fixing tool (7) provides a compression force, by means of a constant pressure, to the laminate (4) against the surface of the shaping tool (3).

Example 1

Several complex configurations of shaped laminates can be obtained from flat laminates with the present invention. Particularly, a first example of shaped laminate configuration with constant thickness is disclosed.

In this example, the thickness of the laminate (4) is constant, and thus the configuration of the section or edge of at least one of the forming tools (2.1, 2.2) is equal or similar to the section of the shaping tool (3) during the manufacturing process.

Such a condition of the profile of the used tools (both forming (2.1, 2.2) and shaping (3) tools), is fulfilled in order to obtain accurate contact between the forming tools (2.1, 2.2) and the laminate (4) which is being shaped against the shaping tool (3).

The contact between the laminate (4) and the forming tool (2.1, 2.2) is constant, so that the pressure is exerted on the laminate (4) in an homogeneous manner, and thus the laminate (4) is compacted appropriately and wrinkles and misformations are avoided on the surface of said laminate (4).

Such configuration example is shown in FIG. 1.

Moreover, if a final part is required having constant laminate thickness and ramps in the perpendicular direction Y, the section or edge of at least one of the forming tools (2.1, 2.2) is equal or similar to the section of the shaping tool (3). In this case the profile of the used tools (both forming (2.1, 2.2) and shaping (3) tools) is shaped so as to obtain such ramps, containing both profiles the required inclination for the formation of the ramp in the shaped laminate (4).

Example 2

A different manufacturing system (1) configuration is used in the event that the shaped laminate does not have a constant thickness, i.e. the shaped laminate has several different sections in the perpendicular direction Y.

Such thickness variations on the shaped laminate are obtained by means of the shaping tool (3) profile or the forming tool (2.1, 2.2) profile, as well as by means of the pressure exerted by the forming tools (2.1, 2.2) against the laminate (4) and thus against the shaping tool (3). Particularly, the configuration of the section of the forming tool (2.1, 2.2) is not equal to the section of the shaping tool (3), the inequalities being reflected in the different profile configuration of the shaping tool (3) and the forming tool (2.1, 2.2).

An additional element which helps the contact of at least one of the forming tools (2.1, 2.2) and laminate (4) to be adequate, is the at least one finger (5) that allows both for thickness changes or ramps in the configuration of the shaped laminate while maintaining the same forming tool (2.1, 2.2) and shaping tool (3).

These fingers (5) have a limited size in the perpendicular direction Y, thus covering only a portion of the laminate (4) which is to be shaped. By means of the fingers (5), the laminate (4) is adapted to small changes of thickness in the surface along the perpendicular direction Y, the laminate (4) being thus compacted over the shaping tool (3) with a uniform force along the perpendicular direction Y.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A manufacturing method for manufacturing shaped laminates, the method comprising:
   a) positioning a flat laminate sheet between forming tools, such that the flat laminate sheet is sandwiched between the forming tools,
   b) compressing the flat laminate sheet between the forming tools by applying pressure to at least one of the forming tools,
   c) discharging, after the step (b), a first portion of the flat laminate sheet from ends of the forming tools adjacent a shaping tool using a conveyor in the forming tools to move the laminate sheet;
   d) in conjunction with the step (c), applying the first portion of the flat laminate sheet from the forming tools directly onto a first portion of an external surface of the shaping tool,
   e) after the step (d), moving at least one of the forming tools and the shaping tool to position the ends of the forming tools to be proximate a second portion of the external surface of the shaping tool;
   f) simultaneously with the step e), a plurality of fingers move with at least one of the forming tools to apply pressure to the laminate sheet on the external surface, and at least one of the fingers is nearer the external surface of the shaping tool than another of the fingers;
   g) after at least the steps (c) and (d), discharging a second portion of the laminate sheet using the conveyor and applying the second portion directly from the forming tools to the second portion of the external surface, wherein the second portion is a continuation of the first portion of the laminate sheet; and h) shaping the laminate sheet to conform to the external surface by the steps (d) to (f).

2. The manufacturing method according to claim 1, wherein in conjunction with the step d), a first end of the laminate sheet is fixed to the shaping tool.

3. The manufacturing method according to claim 1, wherein the steps (b) to (f) are repeated to apply the laminate sheet around a complete perimetral surface of the shaping tool.

4. The manufacturing method according claim 1, wherein previous to the step (g) a cap is formed in a portion of the laminate sheet discharged from the forming tools, wherein the cap is configured for subsequent attachment of the laminate sheet.

5. A method comprising:
sandwiching a laminate sheet between forming tools;
compressing the laminate sheet between the forming tools, wherein the laminate sheet is flat when compressed between the forming tools;
discharging a first portion of the laminate sheet from ends of the forming tools, wherein the forming tools include a conveyor and the discharging of the first portion includes the conveyor moving the laminate sheet to discharge the first portion from the ends of the forming tools;
applying the first portion of the laminate sheet directly from the forming tools onto a first area of an external surface of a shaping tool while retaining a second portion of the laminate sheet between the forming tools;
moving at least one of the forming tools and the shaping tool to position the ends of the forming tools proximate a second area of the external surface of the shaping tool, wherein the second area is continuous with the first area;
after the moving step, discharging the second portion of the laminate sheet using the conveyor from the forming tools direction onto the second area, and
shaping the first and second portions of the laminate sheet to conform to the first and second areas of the external surface of the shaping tool,
wherein the step of shaping includes:
arranging fingers adjacent at least one of the forming tools wherein each of the fingers has a distal end proximate the external surface of the shaping tool,
pressing by the distal ends of the fingers the first portion of the laminate sheet on the first area of the external surface of the shaping tool, and
pressing by the distal ends of the fingers the second portion of the laminate sheet on the second area of the external surface of the shaping tool.

6. The method according to claim 5, further comprising fixing a first end of the laminate sheet to the shaping tool, wherein the first end is adjacent the first portion of the laminate sheet.

7. The method of claim 5, wherein the fingers include a first finger and a second finger, and
the step of shaping includes applying the first finger and the second finger to a first surface of the first portion of the laminate sheet opposite to a second surface of the laminate sheet being applied to the first and second areas of the shaping tool, wherein the first finger and the second finger apply pressure to the first surface to force the laminate sheet against the first and second areas, and wherein the first finger extends forward of the second finger along a direction of movement of the conveyor.

8. The method of claim 5, wherein the distal end of one of the fingers is closer to the external surface than the distal end of another one of the fingers.

9. The method of claim 5, further comprising forming a cap in a third portion of the laminate sheet, wherein the cap is adjacent an end of the first portion or the second portion of the laminate sheet.

10. A method comprising:
sandwiching a first edge region of a laminate sheet between a first pair of forming tools and compressing the first edge region of the laminate sheet between the first pair of the forming tools;
sandwiching a second edge region of the laminate between a second pair of forming tools and compressing the second edge region of the laminate sheet between the second pair of forming tools;
applying the laminate sheet on an external surface of a shaping tool while the first edge region is compressed between the first pair of the forming tools and the second edge region is compressed between the second pair of the forming tools, wherein the first and second pair of forming tools are on opposite sides of the shaping tool;
discharging a first portion of the first edge region from ends of the first pair of the forming tools and onto the external surface of the shaping tool, wherein the first pair of forming tools include a first conveyor and the discharging includes the first conveyor moving the first edge region to discharge the first portion from the ends of the first pair of forming tools;
discharging a first portion of the second edge region from ends of the second pair of forming tools and onto the external surface of the shaping tool, wherein the second pair of forming tools include a second conveyor and the discharging of the first portion of the second edge region includes the second conveyor moving the second edge region to discharge the second portion from the ends of the second pair of forming tools;
moving the first and second pairs of forming tools and/or the shaping tool to move the first and second pairs of the forming tools relative to the external surface of the shaping tool,
after the moving, discharging a second portion of the first edge region from ends of the first pair of the forming tools and onto the external surface of the shaping tool, wherein the discharging of the second portion includes the first conveyor moving the second edge region to discharge the first portion from the ends of the first pair of forming tools;
after the moving, discharging a second portion of the second edge region from the ends of the second pair of forming tools and onto the external surface of the shaping tool, wherein the second pair of forming tools include a second conveyor and the discharging of the second portion includes the second conveyor moving the second edge region to discharge the second portion from the ends of the second pair of forming tools.

* * * * *